March 24, 1953     S. P. McCONNEL     2,632,349
RESILIENT TIRE CHAIN APPLYING CLAMP
Filed Feb. 16, 1948
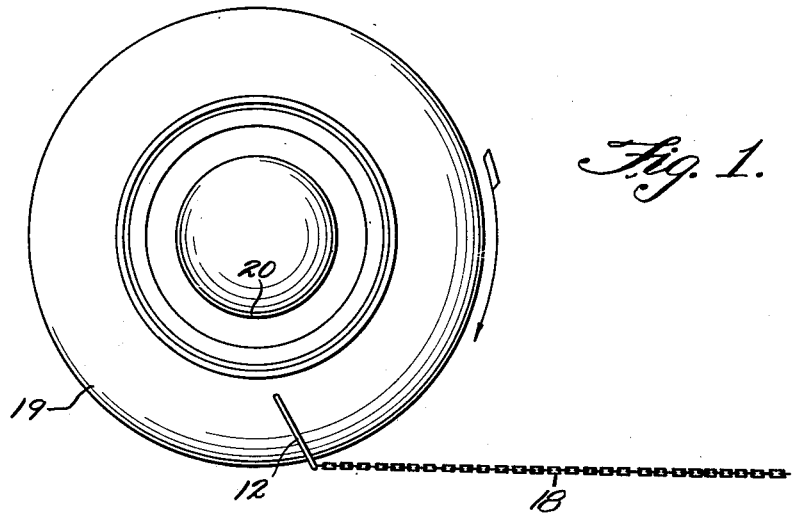
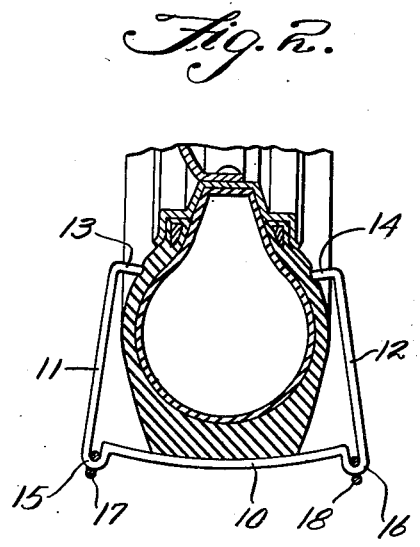
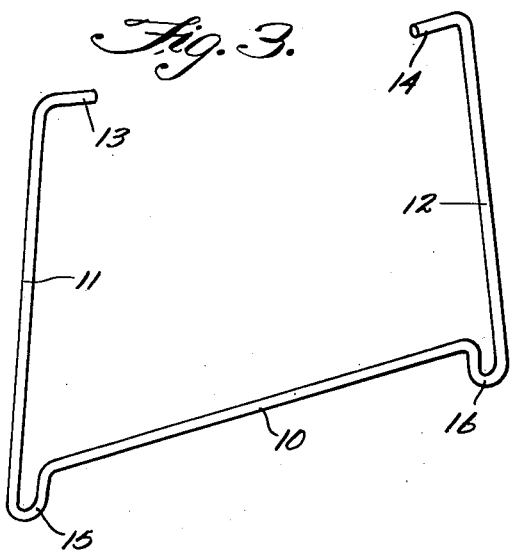
INVENTOR.
Stewart P. McConnel,
BY Victor J. Evans & Co.
ATTORNEYS Patented Mar. 24, 1953

2,632,349

UNITED STATES PATENT OFFICE 2,632,349

RESILIENT TIRE CHAIN APPLYING CLAMP

Stewart P. McConnel, Beaver, Pa.

Application February 16, 1948, Serial No. 8,700

1 Claim. (Cl. 81—15.8)

This invention relates to devices for applying non-skid chains to tires of motor vehicle wheels, and in particular a U-shape holder in which the side chains of a non-skid chain are attached at the outer corners and the bottom member is straight so that the pressure of a tire thereon urges the upper ends of the side arms inward into gripping relation with the side surfaces of a tire and this results in the device assuming a diagonal position which insures its remaining in position on the tire.

The purpose of this invention is to provide means for facilitating attaching non-skid chains to tires of motor vehicles which positively grips the side surfaces of the tire.

Various types of spring clips and the like have been provided for holding the end of a chain on a tire but with the chains attached to the upper parts of the arms and with the device in the form of a U-shaped spring clip the arms open or spread when the pressure of the wheel is applied and it is therefore difficult to hold the end of the chain in position.

With this thought in mind this invention contemplates a tire chain holder that assumes a diagonal position and firmly grips the tire as the load of the wheel is placed thereon.

The object of this invention is, therefore, to improve tire chain applying devices so that the device may readily be snapped over the tire and the wheel turned to install the chain on the tire, and in which the gripping action of the device on the tire will be intensified as the wheel rolls over the device.

Another object of the invention is to provide a tire chain applying device which assumes a diagonal position in use thereby positively holding itself in position.

A further object of the invention is to provide a diagonally disposed tire chain holding device that positively grips the sides of a tire which is of a simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

Figure 1 is a view showing a side elevation of a wheel with part of a chain thereon illustrating the method of applying a chain to the wheel.

Figure 2 shows a cross section through a tire with the device in position thereon.

Figure 3 is a detail showing the tire chain attaching device with the chain and tire omitted.

Referring now to the drawings wherein like reference characters denote corresponding parts the improved tire chain holder of this invention which is substantially U-shaped, includes a straight base bar 10 with upwardly disposed arms 11 and 12, and with inwardly extending ends 13 and 14 on the upper ends of the arms, and chain mounting sockets in projections 15 and 16 at the intersections of the ends of the base member with the arms.

With side chains 17 and 18 attached to the sockets in the projections 15 and 16 the holder may be positioned on a tire 19 and as the wheel 20 is rolled over the bar 10 the bar will bend as shown in Figure 2 and the ends 13 and 14 will be forced into the tire positively holding the device in position. As the wheel is turned the device will assume a diagonal position, as illustrated in Figure 1, positively holding the holder and chain on the tire. The device may be used independently or a plurality of the devices may be used together and each device may carry a short piece of chain as may be desired.

The holder may be made of wire or any suitable material and the chains may be provided with cross members or chains of any type may be used.

It will be understood that modifications may be made in the design or arrangement of the parts without departing from the spirit of the invention.

What is claimed is:

As a new article of manufacture, a device for attaching non-skid chains to tires of motor vehicles, said device being made of a single piece of resilient wire and being shaped to provide a straight base portion, the ends of said base portion terminating in U-shaped chain receiving socket members, each of said socket members including a short arm and a longer arm, said arms extending at substantially right angles with respect to said base portion, there being an arcuate web interconnecting said arms a substantial distance below said base portion, said longer arms extending upwardly from said base portion and having their upper ends converging towards each other, and a finger arranged transversely with respect to each upper end of said longer arm, said fingers being arranged in opposed facing relation with respect to each other, the inner ends of said fingers being blunt.

STEWART P. McCONNEL.

REFERENCES CITED

The following references are of record in the file of this patent:

UNITED STATES PATENTS

| Number | Name | Date |
| --- | --- | --- |
| 1,571,764 | Edwards | Feb. 2, 1926 |
| 2,166,869 | Lees et al. | July 18, 1939 |
| 2,175,395 | Hewel | Oct. 10, 1939 |
| 2,213,910 | Higgins et al. | Sept. 3, 1940 |
| 2,445,947 | Hoppes | July 27, 1948 |